Oct. 22, 1974 R. E. ROHLWING 3,843,439

TAPE DISPENSER

Filed March 6, 1972

3,843,439
TAPE DISPENSER
Robert Edward Rohlwing, Cary, Ill., assignor of a fractional part interest to Charles W. Jirauch
Filed Mar. 6, 1972, Ser. No. 231,847
Int. Cl. B32b *31/00;* B44c *7/00*
U.S. Cl. 156—523 9 Claims

ABSTRACT OF THE DISCLOSURE

A tape dispenser for applying a piece of tape to a surface comprising a container for rotatably mounting a roll of tape, a pressing means to press said tape to said surface as said tape exits from said container, a movable cutting means to sever said piece of tape pressed onto said surface, and a braking means to hold said roll of tape stationary as said piece of tape is severed from said roll of tape.

This invention relates to a container and dispenser for storing and applying pressure sensitive tape.

Conventional portable dispensers of pressure sensitive tape are inconvenient to use, require an unnecessary amount of time to apply the tape to a surface, and often produce undesirable results.

The conventional dispensers are inconvenient to use because they require the user to touch the sticky adhesive surface of the tape with his fingers when extracting and cutting a piece of tape, such that some of the tape's adhesive invariably remains on his fingers. These dispensers also require the simultaneous use of both hands, as opposed to one hand, to extract the tape from the dispenser, cut it, and apply it to the surface to be taped; this results in the necessity of holding or stabilizing the surface to be taped with some other means or part of the body than the user's hand.

Conventional dispensers consume an unnecessary amount of time in their use because the operations of extracting the tape, cutting it, and applying it are performed sequentially rather than simultaneously.

The presently available tape dispensers often produce undesirable results because the tape is frequently cut to the wrong length or is positioned improperly on the surface being taped since the user must guess as to the proper length and orientation of the piece of tape needed. In addition, when longer pieces of tape are required, the tape curls and sticks to itself or some other unintended object. Furthermore, the tape's ends commonly do not stick to the intended surface and appear smudged and dirty because the user must hold and touch the adhesive side of the tape. The common outcome of any of these defects in the tape is that the piece of tape must be discarded and a second piece of tape severed from the roll of tape held by the conventional dispensers.

Therefore, it is a general object of this invention to provide a pressure sensitive tape dispenser that overcomes all these drawbacks in the prior art dispensers.

More particularly, it is an object of my invention to provide a dispenser that requires the use of only one hand to extract a piece of tape from the dispenser, cut it, and apply it to the intended surface so that the other hand can simultaneously perform other operations such as holding steady or immobile the surface to be taped.

Another important object of my invention is to provide a dispenser that eliminates the necessity to transport a piece of severed tape from the dispenser to the intended surface, but rather allows the user to extract the tape from the dispenser and to apply it to the surface simultaneously. A related object is to provide a dispenser that enables the user to extract, cut, and apply a piece of tape in a minimum of time and with a minimum of effort by overlapping the performance of these operations.

A yet further object of my invention is to provide a dispenser that cuts the tape only after the proper length of tape has been applied to a surface to eliminate the possibility of applying the wrong length of tape.

Additionally, it is an object of my invention to provide a dispenser that allows the user to extract, cut, position, and apply a piece of tape while touching the adhesive side of the tape almost not at all, thus eliminating the problem of the tape sticking to the user's fingers and causing improper positioning of the tape, the loss of adhesiveness, and a smudged, dirty appearance.

It is also an important object of my invention to provide a dispenser that presses the tape to the surface as the tape is extracted from the dispenser and before it is severed to prevent the tape from curling and sticking to itself or other objects when long lengths of tape are needed.

A further object of my invention is to provide a dispenser that minimizes tape waste from defects in the tape incurred during application of the tape to a surface.

Another object of this invention is to provide a dispenser of the type described that is easy and inexpensive to manufacture.

Other objects and advantages of this invention may be seen in the details of its construction and operation as set forth in the present specification and the accompanying drawings, wherein.

By disclosing herein an embodiment of my invention, I do not intend hereby to limit my invention to that one embodiment; rather I intend that my invention should be defined and limited only by the appended claims and should include all embodiments and equivalents that are within the spirit and scope of the invention as defined in these claims.

Figures 1, 2, 3, 4, 5:
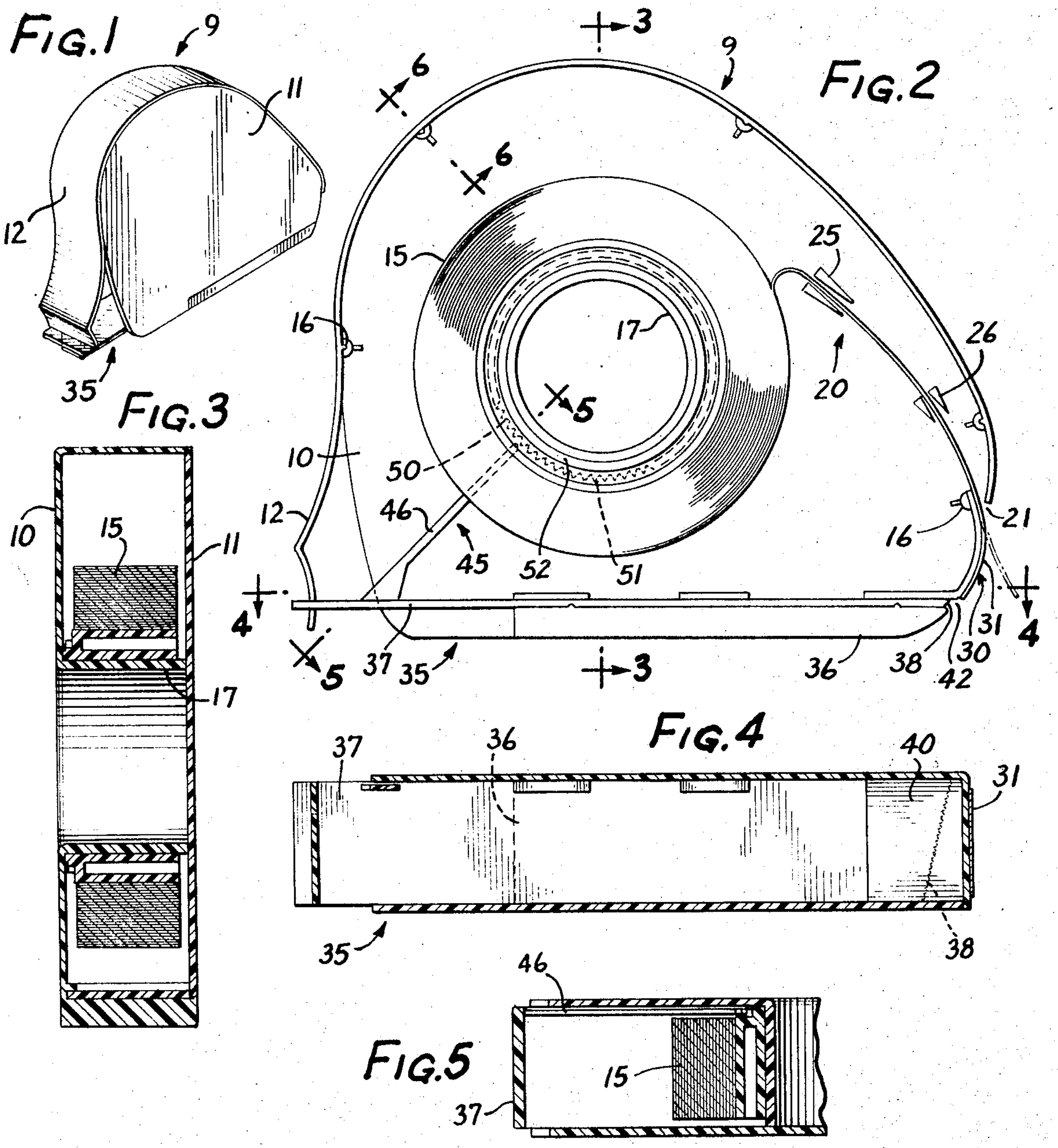
FIG. 1 is a perspective view of a dispenser constructed according to my invention.
FIG. 2 is a side view of the dispenser of Figure 1 with one its side panels removed.
FIG. 3 is a sectional view of the dispenser taken in the plane 3—3 of FIG. 1.
FIG. 4 is a section view of the dispenser taken in the plane 4—4 of FIG. 1.
FIG. 5 is a sectional view of the dispenser taken in plane 5—5 of FIG. 1.
Figure 6:
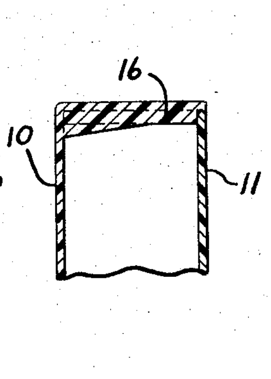
FIG. 6 is a sectional view of the dispenser taken in plane 6—6 of figure.

Referring to FIG. 1, there is illustrated a tape dispenser 9 constructed according to the present invention. The body of the dispenser is a container that includes two parallel side panels 10, 11 interconnected by a connecting section 12 which extends in an arcuate, circle-like pattern along the top, the bottom, and a side of the dispenser and is wider than the tape stored in the dispenser to allow unimpeded rotation of a roll of tape 13 within the dispenser. Both the connecting section 12 and the side panels 10, 11 are preferably molded plastic with the connecting section and side panel 10 permanently attached or formed of a single piece of molded plastic. Side panel 11 clamps onto the edge of the connecting section, as an example, through the use of small mating clamps 16 on the connecting section and the removable panel 11, so that this panel is easily removable to allow quick replacement of the roll of tape 13 rotatably mounted on a stationary axis or core 17 attached to or molded with the permanently attached side panel 10.

The permanently attached side panel has a guide means 20 that directs the tape to an exit slot or opening 21 in the bottom of the connecting section 12 with the adhesive side of the tape facing downward. The guide means 20 comprises two pairs of guideposts 25, 26 mounted on or molded with the side panel 10 with a small separation between the two guideposts of each pair through which the tape passes. When moved in a backward direction, that is, toward the core 17, the tape will curl slightly and contact the guideposts 25, 26 and stick thereto. Thus, in addition to directing the tape to the exit slot, the guideposts prevent the tape from retracting into the dispenser 9 to insure that a small portion of the tape will extend through the opening after a piece of tape has been severed from the roll.

Attached to or molded as a part of the connecting section 12 immediately behind the slot 21 is a pressing means 30 comprising a small press plate or knob 31 that presses the tape onto a surface to be taped as the tape exits from the dispenser through the exit opening to apply the tape tightly to the surface.

In accordance with the invention, the dispenser includes a movable cutting means 35 for severing a piece of tape from the roll after the piece of tape has been applied to a surface by the pressing means. The cutting means 35 includes a cutter guide 36 that is carried by the side panel 10 and extends vertically along the back side of the dispenser 9. Resiliently attached or molded to the top of the connecting section 12 is a cutting plate 37 which extends downward to the bottom of the dispenser behind the press plate 31. On the bottom of the cutting plate is an angled serrated cutting edge 38. The cutting edge can be cut out of the cutting plate itself or it can be a cutting means attached to the cutting plate. The cutting plate is preferably not as wide as the connecting section, but it is at least as wide as the tape to be cut.

Mounted on the front side of the cutting plate 37 is a guide plate 40 that is as wide as the connecting section so that it rests against the back, vertical edges of both side panels. The guide plate 40 and the cutter guide 35 function to guide the cutting plate 37 and its cutting edge 38 vertically downward so that the cutting edge passes through the cutting edge opening 42 between the cutter guide and the body of the dispenser to cut the tape lying across the cutting edge.

To brake the rotation of the roll of tape carried on the axis and hold the roll approximately stationary during the cutting operation, the dispenser preferably includes a braking means 45. The braking means 45 consists of a stopping bar 46 attached or molded to the front side of the cutting plate 37 and extending into the interior of the dispenser 9. The braking means also includes a rotatable stopping plate 50 which is a circular plate with a plurality of radially extending teeth 51 on its circumference and a central, hollow hub 52 which is forced into the open center of the roll of tape 15 to rotatably mount the roll of tape on the axis. When the cutting plate is depressed to cut a piece of tape, the stopping bar 46 moves between two adjacent teeth and holds the stopping plate and the roll of tape motionless as the tape is cut.

When the dispenser is not being used, a cap (not shown) snaps over the exit slot and the small portion of tape that protrudes through this slot so that the tape will not adhere to any surfaces with which the dispenser comes in contact.

To operate the dispenser to apply a piece of tape to a surface, the dispenser 9 is held in the user's palm with one finger on the top of the cutting plate 37 where it is attached to the connecting section 12. The leading edge of the roll of tape which protrudes through the exit slot 21 is pressed against the surface, and the dispenser is pulled backward over the surface to be taped so that the roll of tape 13 begins to rotate counterclockwise to allow the tape to exit the dispenser through the exit slot. As the tape escapes the dispenser, the pressing means 30, which is operative by means of a downward pressure exerted by the user, presses the tape tightly against the surface so that the tape adheres thereto. During this operation the user's second hand can hold the surface so that it does not move.

When the surface has been completely taped as desired, the dispenser is stopped and then rotated counterclockwise through approximately 90°, to the position shown in FIG. 2, so that the dispenser is resting on its cutting guide 36. The cutter plate is actuated and moves in a horizontal direction, approximately parallel to the tape on the surface, to sever the tape which is stretched across the cutting edge opening 42. When the cutting plate is actuated, the braking means 45 locks the roll of tape so that the cutting edge 38, when it contacts the tape, severs it and does not pull additional tape from the dispenser.

I claim:

1. A tape dispenser comprising a container for rotatably carrying a roll of tape, an opening in said container for a piece of tape from said roll to exit from said container;

a pressing means on said container to apply said piece of tape to a surface as said piece of tape exits from said container;

a cutting means resiliently formed of a single piece of material with at least part of said container and movable relative thereto for severing said piece of tape from said roll; and braking means operable to lock said roll in an approximately stationary position when said cuting means is moved to sever a piece of tape from said roll, including a means attached to and movable with the cutting means.

2. A tape dispenser as in claim 1 further comprising means to hold an end of said roll of tape through said container opening after said piece of tape has been severed.

3. A pressure sensitive tape dispenser for applying lengths of pressure sensitive tape from a roll of tape to be carried by said dispenser comprising, in combination, at least one side panel;

first means attached to said side panel to form a container for a roll of tape;

second means for rotatably supporting a roll of tape in said container;

an exit in said continer;

pressing means adjacent said exit for pressing a length of tape pulled from a roll of tape through said exit onto a surface to be taped;

cutting means for severing the length of tape that has been pressed onto a surface from the roll of tape;

said cutting means and first means being formed of a single piece of material such that said cutting means is resiliently movable relative to said first means and said container; and braking means operable for locking the roll of tape in a stationary position while said cutting means severs the length of tape from the roll of tape including a third means attached to and movable with the cutting means has been inserted.

4. A pressure sensitive tape dispenser as in claim 8 wherein said braking means comprises plate means having a plurality of teeth on its periphery carried by said second means to contact the roll of tape to lock the roll in a stationary position when said plate is held stationary and, said third means comprises, means movable to contact said plate means between adjacent teeth for holding said plate means stationary while said cutting means severs the length of tape from the roll of tape.

5. A pressure sensitive tape dispenser as in claim 3 wherein said cutting means comprises a cutting plate with a serrated edge on its bottom; and a cutting guide carried by said container to guide said serrated edge to sever the length of tape.

6. A pressure sensitive tape dispenser as in claim 5 wherein said braking means comprises plate means having a plurality of teeth on its periphery carried by said second means to lock the roll of tape in a stationary position when said plate is held stationary and said third means comprises means carried by and movable with said cutting means to contact said plate means between adjacent teeth for holding said plate means stationary while said cutting means is being operated to sever the length of tape from the roll of tape.

7. A pressure sensitive tape dispenser as in claim 6 wherein said contacting means is a stopping bar that extends into the interior of said container.

8. A pressure sensitive tape dispenser as in claim 6 wherein said plate means further comprises a hollow hub extending transversely relative to the periphery of said plate means for tightly engaging the interior of the roll of tape for rotatably supporting the roll of tape on said second means.

9. A pressure sensitive tape dispenser as in claim 13 wherein said contacting means is formed of the single piece of material with the cutting means and first means so that the contacting means is also resiliently movable relative to said first means and said container.

References Cited

UNITED STATES PATENTS 3,125,263 3/1964 Harbour ............ 156—523

DOUGLAS J. DRUMMOND, Primary Examiner

U.S. Cl. X.R.

156—577